United States Patent [19]
Naylor, Jr. et al.

[11] Patent Number: 5,987,219
[45] Date of Patent: Nov. 16, 1999

[54] METHOD OF PRODUCING A DITHER MATRIX BY DIVIDING AN ARRAY INTO A PLURALITY OF REGIONS AND ALTERING THE BORDERS OF EACH REGION TO HAVE CONTINUOUS IRREGULAR BOUNDARIES

[75] Inventors: William Clark Naylor, Jr., Santa Clara, Calif.; Kia Silverbrook, Leichhardt, Australia

[73] Assignee: Canon Information Systems Research Australia Pty. Ltd., New South Wales, Australia

[21] Appl. No.: 08/586,828

[22] PCT Filed: Sep. 1, 1994

[86] PCT No.: PCT/AU94/00515

§ 371 Date: May 28, 1996

§ 102(e) Date: May 28, 1996

[87] PCT Pub. No.: WO95/06911

PCT Pub. Date: Mar. 9, 1995

[30] Foreign Application Priority Data

Sep. 1, 1993 [AU] Australia ................. PM0972
Oct. 21, 1993 [AU] Australia ................. PM1944

[51] Int. Cl.$^6$ .................. G06K 15/02; H04N 1/52; H04N 1/405
[52] U.S. Cl. .................. 395/109; 382/237; 382/270; 358/535; 358/457; 358/459; 358/466; 358/298
[58] Field of Search .................. 382/237, 252, 382/270, 275; 358/454, 456, 457, 458, 466, 298, 533, 534, 535, 536; 395/109

[56] References Cited

U.S. PATENT DOCUMENTS

| | | | |
|---|---|---|---|
| 4,698,778 | 10/1987 | Ito et al. | |
| 4,920,501 | 4/1990 | Sullivan et al. | 358/457 |
| 5,151,973 | 9/1992 | Sasaki et al. | 395/109 |
| 5,201,030 | 4/1993 | Carrie | |
| 5,214,517 | 5/1993 | Sullivan et al. | 358/456 |
| 5,243,446 | 9/1993 | Pollich et al. | 358/466 |
| 5,438,431 | 8/1995 | Ostromoukhov | 358/457 |
| 5,469,516 | 11/1995 | Kerz | 382/254 |
| 5,526,021 | 6/1996 | Naylor, Jr. | 358/456 |

OTHER PUBLICATIONS

"Optimization By Simulated Annealing" by S. Kirkpatrick, et al., Science, 220: pp. 671–680 (1983).

*Primary Examiner*—Scott Rogers
*Attorney, Agent, or Firm*—Fitzpatrick, Cella, Harper & Scinto

[57] ABSTRACT

A dither matrix is produced by creating an array of dots and dividing the array into a mutiplicity of regions, each of the regions having a multiplicity of dots. Borders of the regions are altered to have substantially continuous randomly irregular boundaries, and dither values are assigned to each of the regions.

38 Claims, 10 Drawing Sheets

Dither values for region
(Nyerk factor = 4)

Dots on at intensity = 3

Dots on at intensity = 4

Dots on at intensity = 6

Dots on at intensity = 9 ized through the use of a clustered dot ordered dither technique whereby,
METHOD OF PRODUCING A DITHER MATRIX BY DIVIDING AN ARRAY INTO A PLURALITY OF REGIONS AND ALTERING THE BORDERS OF EACH REGION TO HAVE CONTINUOUS IRREGULAR BOUNDARIES The present invention relates to the display of images by usage of the halftoning technique of dithering and in particular, relates to the display of images having multiple colour components.

BACKGROUND ART

Digital halftoning for the purpose of generating colour images with multiple levels is a well known art. For an extensive review of the field of halftoning, reference is made to "Digital Halftoning" by R. Ulichney, MIT Press, Cambridge, Mass. The area of halftoning is generally divided into the fields of dithering and error diffusion. The field of dithering is generally divided into the areas of random dither, clustered dot ordered dither and dispersed dot dither. Of these, clustered dot dither and dispersed dot dither are the most prevalent.

Both clustered dot dither and dispersed dot dither are based on the creation of a threshold screen pattern or dither matrix, for example an 8×8 array of image pixels. This dither matrix is compared, pixel by pixel, with inputted digital image values, with the dither matrix being treated in a 'modulo' or 'wrap-around' sense. If the inputted value is greater than or equal to a current dither matrix value, the output at that point is set to be "on" and if it is less than the output, it is set to be "off".

The difference between the two techniques of clustered dot dither and dispersed dot dither is that in clustered dot dithering the lower threshold values are centred in a clustered pattern. Whereas in the dispersed dot dithering screen pattern the lower threshold values are scattered. As such, the clustered-dot technique has a central dot that increases in size as the signal level increases whilst the dispersed-dot technique has small scattered dots that increase in number as the signal level increases. In both techniques, the number of levels that can normally be represented is equal to the size of the dither matrix. For example, an 8×8 dither matrix is generally designed to produce 64 unique levels. If more levels are required then larger dither matrix sizes can be used. However, for a given type of display equipment. this will mean a reduction in the effective spatial resolution that can be achieved with clustered dot dithering because the dither matrix size will be larger, thereby taking up more space for the printing of each individual pixel. By way of example, high quality offset printers are generally able to print approximately 2400 dots per inch. However, images are normally printed in the order of 150 pixels to the inch. Since 2400/150=16, this provides a 16×16 array of dots for each individual pixel, and allows for 256 different possible intensity levels.

DESCRIPTION OF THE PRIOR ART DRAWINGS

In relation to the prior art,

FIG. 1 illustrates the problems associated with dot gain for a single pixel;

FIG. 2 illustrates the problem of dot gain for multiple dots clustered together;

The need to use a clustered dot technique arises from the occurrence of dot gain. Dot gain is normally a consequence of the printing technology used whereby there is a non-linear response function of the amount of ink or toner used in relation to the size of the dots produced through the usage of that amount of ink or toner. Referring now to FIG. 1, there is shown an example of dot gain. It is desired to lay down a certain standard size dot 1 on a piece of paper. However, as a consequence of the printing process, it is often found that the ink used can actually produce, in some circumstances, a smaller dot 2 or, in other circumstances, a larger dot 3. This results in a large error factor or "dot gain" for each individual dot (where the dot shrinks the "gain" is negative). The opacity profile of each individual dot can also vary across the dot with the variation often being approximately gaussian in nature.

The occurrence of dot gain is normally minimised through the use of a clustered dot ordered dither technique whereby, in each dither cell the dots are clustered together. Referring now to FIG. 2, there is shown an example of this process whereby nine dots 4–12 are placed along side one another. If each individual dot experiences dot gain, the largest area that these individual dots will create is the area 13, with the smallest area is the area 14. It can therefore be seen that the process of clustering dots in a clustered dot dithering approach results in a lessening of the overall error in the representation of an image on the paper of any particular size, than would be the result if a dispersed dot dithering approach was used.

The dot gain problem results in a systematic shrinking or growing of small ink dots on the page. Dot gain can lead to a number of other problems, including:

1) In near black or near white regions, large dots can become visible. The image appears to have 'dandruff' or to be covered with light snow. This is because the few large dots printed undergo expansion. It would be better to print more dots but of smaller size. This effect is a result of the process outlined in FIG. 1.

2) It will be evident that dot gain changes the percentage of the page covered by ink. This leads to intensity distortion of any image from its true intensity as previously discussed with reference to FIG. 1.

Dot gain is a particular problem in the offset printing process, and can result from such factors as stretching of the paper or film, variation in the ink absorption rate with dot size as well as many other factors. Other printing devices, such as laser printers, are also known to experience dot gain problems and as a result clustered dot dithering is employed to improve the quality of images printed on laser printers.

Unfortunately the use of large clustered dot dither matrices is not without significant disadvantages, especially in the field of colour printing where multiple passes are made using different colour inks to produce the final image. In particular, patterns can arise from the combination of one or more different coloured inks whereby each primary colour has been produced by using a clustered dot dither matrix. These patterns are known to those skilled in the art as 'Moire patterns' and 'Rosettes' and result primarily from the setting up of beat frequencies through the interaction of the various dither value arrangements for different screen colours.

Additionally, a centrally clustered dot in a large dither matrix can often lead to other regular patterns in even black and white images that are evident to the human eye in the final printing.

OBJECT OF THE INVENTION

It is an object of the present invention to provide an improved form of dither matrix producing improved results on at least one class of images.

SUMMARY OF THE INVENTION

In accordance with the first aspect of the present invention there is disclosed a method of producing a dither matrix, said method comprising the steps of:

creating an array of dots and dividing said array into a multiplicity of regions, each of said regions having a multiplicity of dots;

altering the borders of said regions to have substantially continuous irregular boundaries; and assigning dither values to each of said regions.

Preferably the altering step includes altering the positions of said regions within said array so that the position of the centre of gravity of each of said regions is substantially irregularly placed within said array.

Preferably the assigning step includes optimizing the assignment of dither values so as to disperse regions which are illuminated at the same level.

In accordance with a second aspect of the present invention there is provided a method of producing an array comprised of regions, said regions having irregular boundaries and irregular placement within the array, said method comprising the steps of:

determining an initial layout of regions within the array; and optimizing the layout of each region with respect to a centre of gravity measure of each region.

In accordance with a third aspect of the present invention there is provided a method of producing a dither matrix, said method comprising the steps of:

creating an array of dots and dividing said array into a multiplicity of regions, each of said regions having a multiplicity of dots;

assigning a first dither value to each of said regions;

dividing the regions into at least two groups, with a first group containing lower dither values and a second group containing higher dither values;

for those regions in the first lower dither value group, assigning increasing dither values, around said first dither value, to the dots within each region, in order of increasing distance of a current dot from a central portion of said region; and for those regions in the second higher dither value group, assigning increasing dither values, around said first dither value, to the dots within each region in order of decreasing distance of the dot from from a central portion of said region.

DESCRIPTION OF THE DRAWINGS

The preferred embodiment of the present invention will now be described with reference to the accompanying drawings in which.

DESCRIPTION OF THE PREFERRED EMBODIMENTS

Figure 1:
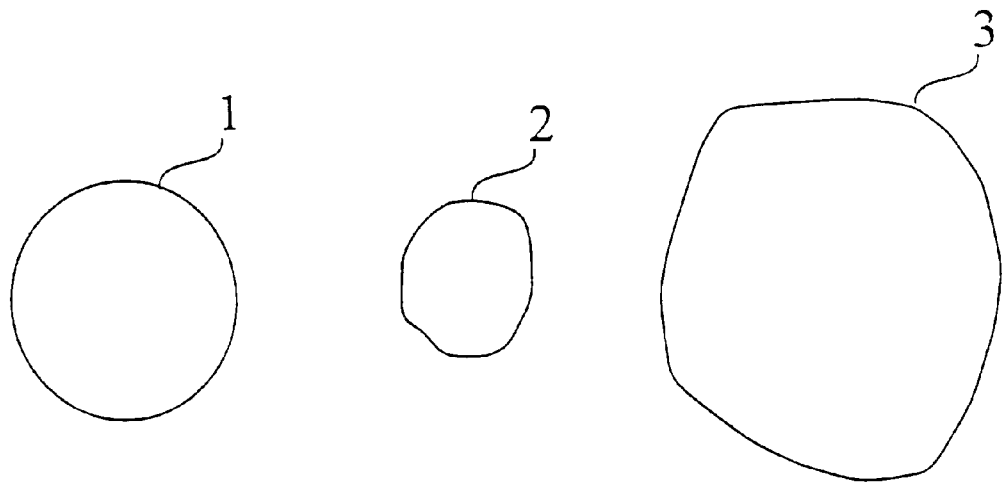
Figure 2:
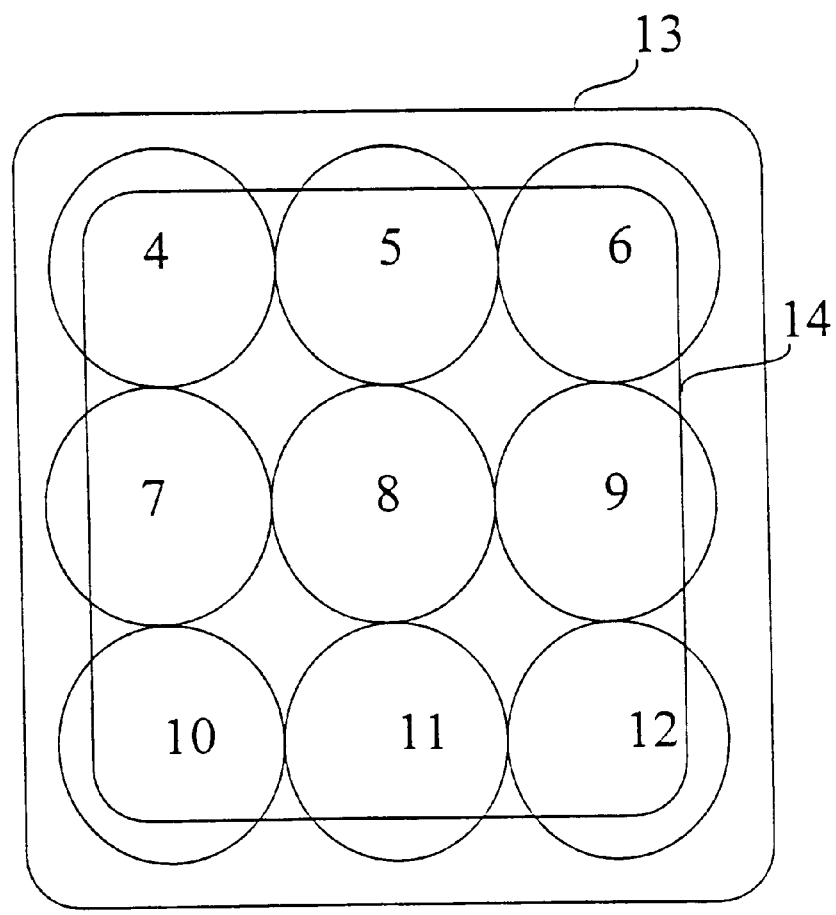

A first embodiment of the present invention is directed to the production of an improved dither matrix whose actual form is dependent on the characteristics of the type of printing equipment being used. In particular, the particular nature of the dot gain characteristics of the printing device to be used are of concern. It will be assumed, for the purposes of explanation, that the characteristics of the device to be used are such that the optimal number of dots which should be clustered together is nine, with a lesser number leading to errors due to dot gain which are considered to be too large. It should be noted that each printing device will have its own printing characteristics and so for the best results, different sized clusters should be utilised to test the relevant printing device to be used so as to determine the most suitable size.

The dither matrix of the first embodiment is produced through a multiple staged process which will be described in detail hereinbelow, However, this process is outlined by the following steps:

1. Produce a large array consisting of regions with each region consisting of the minimum number of dots (in this case nine) and with each region having an irregular border and having an irregular placement within the array.

2. Produce a dither matrix from the first large array having dispersed dot characteristics.

3. A novel optional final processing step (for which the term "Nyerking" is hereby coined) can be utilised and is designed to significantly enhance the final dither matrix and to further decrease the affects of dot gain.

The production of the arrays in steps 1 and 2 above, rely heavily on a process known as simulated annealing. Simulated annealing is an efficient method for finding an acceptable minimum value of a function of many independent variables. This function, usually called the 'cost function' or 'objective function', represents a quantitative measure of the 'goodness' of some complex system. A brief outline of the process of simulated annealing is presented as follows, however for a detailed explanation of the process of simulated annealing reference is made to 'Optimization by Simulated Annealing' by S. Kirkpatrick, C. D. Gelatt, Jr., and M. P. Vecchi, (1983) Science, 220: 671–680, the disclosure of which is hereby incorporated by cross-reference.

The first step in the process of simulated annealing is to generate an objective which has a value dependent upon a set of variables $x_l$ to $x_m$. The values of the variables $x_l$ to $x_m$ are given a small random change and the objective is re-evaluated to give a new value dependent on the current state of the variables $x_l$ to $x_m$. The values of the variables $x_l$ to $x_m$ are again given a small random change and the objective is re-evaluated and compared to the old value of the objective. The change in the objective value can be referred to as $\Delta obj$.

If the change in the variables has resulted in a lower objective, then the new set of variables is always accepted. If the change in the variables resulted in a higher value for the objective, then the new set of variables may or may not be accepted. The decision to accept the new set of variables is determined with a given probability, the preferred probability of acceptance being:

$$Prob(\Delta obj) = e^{\left(\frac{-k\Delta obj}{T}\right)} \quad \text{(EQ 1)}$$

where k is a predetermined constant and T is the simulated 'temperature' of the system.

Hence for a given obj, a high temperature T will result in a high probability of acceptance of the change in the values of $x_l$ to $x_m$, where as at a low temperature T, there will only be a small probability of acceptance. The temperature T is initially set to be quite high and is reduced slightly in each iteration of the annealing loop. The overall structure of a computer program in pseudo code implementing the simulating annealing process is as follows:

```
T = start_temperature;
variables = start_variables
loop_until (convergence or temperature_too_cold)
    {
        /* generate random change of variables*/
        new_variables = random_small_change(variables);
        /* evaluate random change */
        Δobj = objective_function(new_variables) − objective_function(variables);
if( Δobj < = 0)
{           /* always accept improvements */
        variables = new_variables;
        }
else if (random_float_between_0_and_1( ) < exp(−kΔobj/T))
        {
        /* sometimes accept degradation */
        variables = new_variables;
        }
else
        {
        /* reject new_variables*/
        }
decrease T slightly, according to annealing schedule;
}
```

Figure 3:
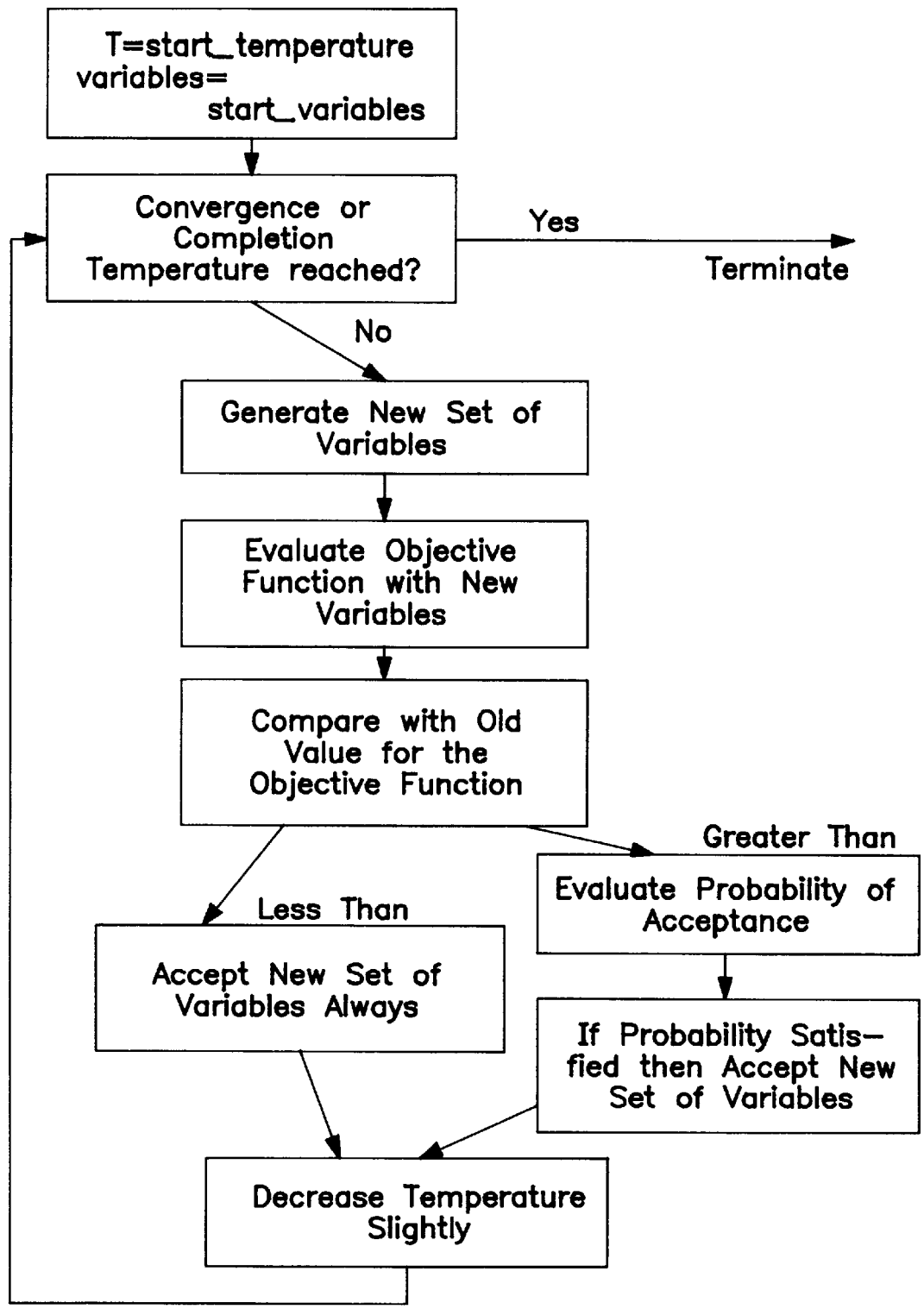
FIG. 3 illustrates, in flow chart form, the process of simulated annealing.

A flow chart for use in implementing the above is shown in FIG. 3. From the chart and the foregoing description, it will be apparent that the procedure is not unlike the cooling of heated atoms to form a crystal. Hence, the term 'simulated annealing' and the reference to temperature is analogous to the usual measure of the temperature of a system.

The preferred form of creation of the dither matrix will now be outlined with respect to the hereinbefore mentioned steps:

1. Produce a large array consisting of regions, with each region consisting of a minimum number of dots and with each region having an irregular border and having an irregular placement within the array.

Figure 4:
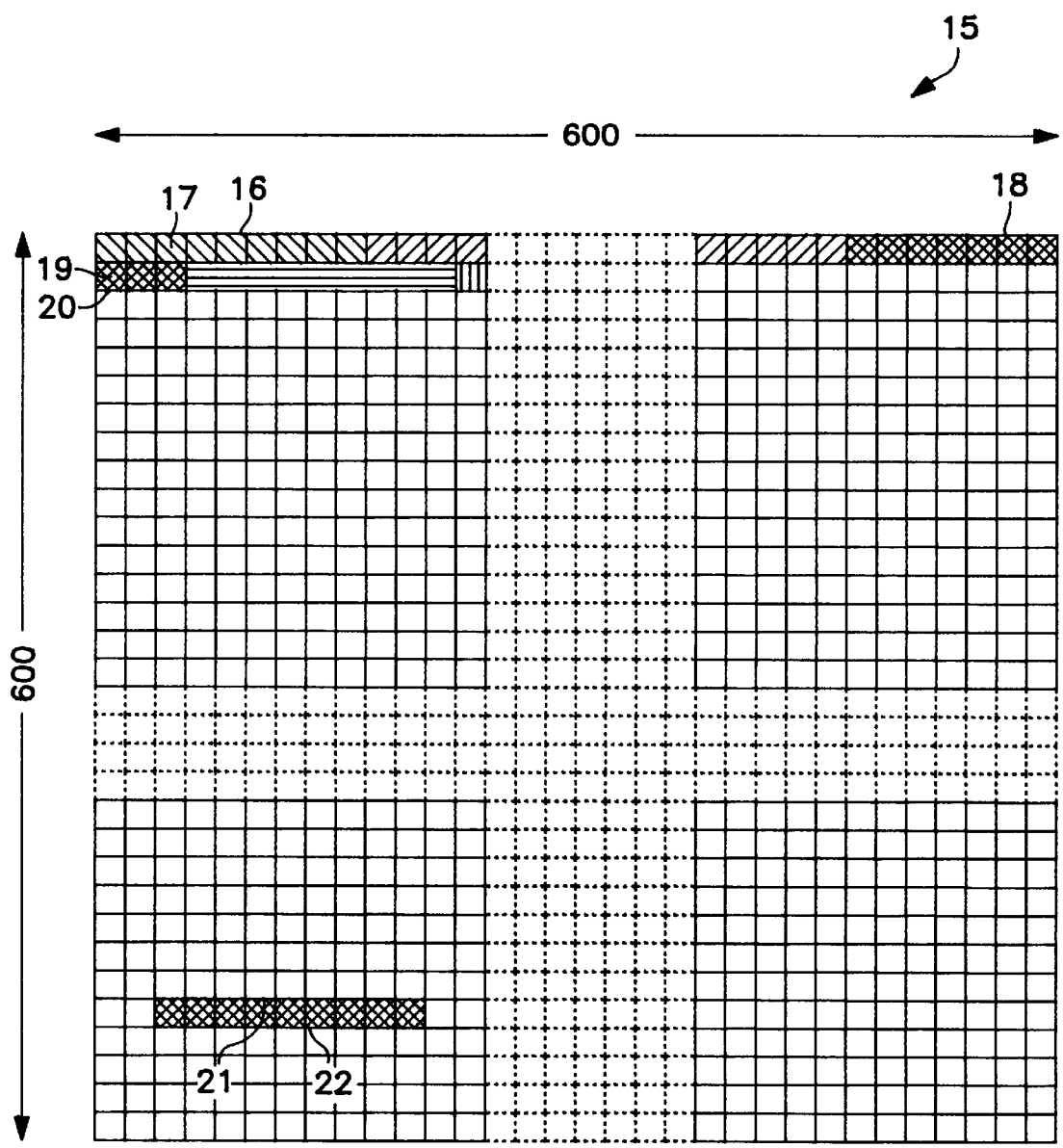
FIG. 4 illustrates, in part, the initial form of a 600×600 array of dots.

In this first process the size of the array is preferably chosen to be an integral multiple of the minimum number of dots defining a region. Referring now to FIG. 4, there is shown, in part, one chosen array 15 of size 600×600 dots. The objective of this stage of the dither matrix creation process is to fill this array with connected regions of nine dots with each region having an irregular border. This objective is achieved by first filling the array with straight line regions 16 each consisting of nine dots 17, with a record kept of which region 16, each dot 17 belongs to.

The array 15 is treated in a full 'wrap-around' or 'modulo' sense, with regions 18, occurring at the end of one line, continuing on the next line 19. Similarly, regions exiting from the bottom of the array are able to continue at the top of the array.

Once the regions have been initially created in the array 15 as straight lines, the array is subjected to a variation of the process of simulated annealing. In the annealing process, the objective function used is a measure of the distance of each dot of a particular region from the 'centre of gravity' of that region. Hence the objective function is equivalent to the sum, over all regions, of each pair of dots within a region, of the distance squared between the pair of dots. This centre of gravity measure is shown below as (EQ 2):

$$Obj = \sum_{(all\ regions)} \sum_{\substack{pairs\ d1,d2 \\ within\ a\ region}} dist(d1, d2)^2 \quad \text{(EQ 2)}$$

Where dist (d1,d2) is the distance from dot d1 to dot d2 within a region. The preferred measure of distance dist( ) is the Euclidean distance between the dots, but, as the dither matrix is generally repeated in the vertical and horizontal directions, dist( ) is measured modulo the size of the dither matrix. For example, if:

p1=(x1,y1)

p2=(x2,y2) are two arbitrary cells in the dither matrix at positions x1,y1 and x2,y2, then, for a n×m dither matrix, the preferred distance measure is:

$$dist(p1, p2) = \sqrt{[(x1 - x2) \bmod n]^2 + [(y1 - y2) \bmod m]^2} \quad \text{(EQ 3)}$$

where the mod function extends to negative numbers in accordance with the following relation which holds for all x:

$$x \bmod m = (x-m) \bmod m \quad \text{(EQ 4)}$$

For example, −3 mod 5=2 mod 5=2.

The form of mutation or variation of variables used in this first annealing process can be the random swapping of two dots within the array 15. For example dot 20 belonging to region 18 and dot 21 belonging to region 22 are chosen at random and swapped. In this example, this swapping would result in a substantial increase in the objective function as the shortest distance from the new position of the dot 21 to the centre of mass of region 22 would have been substantially increased. (Note that this distance, being measured in a modulo sense, would be a distance going off the bottom of the array 15 and down from the top of the array. Such a large increase in distance results in a low likelihood of acceptance of this variation. The preferable method used for variation is therefore to pick a dot at random and to only choose candidate dots for swapping which are a predetermined distance from the chosen dot. In the present embodiment a distance of three units was used from which to choose candidates for swapping. This was found to greatly increase the chances of acceptance of the variation.

It should be noted that it is not necessary to recalculate the whole objective function as a result of making a variation, as the only affect that the variation will have on the objective will relate to the centre of gravity of the regions where dots have been swapped and the distance measures of the dots within these regions. Therefore, substantial efficiencies can be gained by only examining the effect on the altered regions and altering the overall sum of the objective function.

In swapping two dots the change ($\Delta$obj) in the objective will be that portion of the objective due to the new position of the dots minus that portion due to the old position of the dots.

For example. if dot d1 belongs to region r1 and dot d2 belongs to region r2 then the change in the objective function due to swapping d1 and d2 will be as follows:

$$\Delta obj = \text{Post-swapped portion due to } d1, d2 - \text{Pre-swapped portion due to } d1, d2 \quad (EQ\ 5)$$

$$= \sum_{\substack{\text{all dots } d \text{ belonging} \\ \text{to region } r1 \text{ and } d \neq d_1}} dist(d, d_2)^2 +$$

$$\sum_{\substack{\text{all dots } d \text{ belonging} \\ \text{to region } r2 \text{ and } d \neq d_2}} dist(d, d_1)^2 -$$

$$\sum_{\substack{\text{all dots } d \text{ belonging} \\ \text{to region } r1 \text{ and } d \neq d_1}} dist(d, d_1)^2 -$$

$$\sum_{\substack{\text{all dots } d \text{ belonging} \\ \text{to region } r2 \text{ and } d \neq d_2}} dist(d, d_2)^2$$

as can be seen from equation 5, the change on the overall objective function of Equation 2 from swapping two dots d1 and d2 can be calculated from only considering the two regions to which the dots belong.

Figure 5:
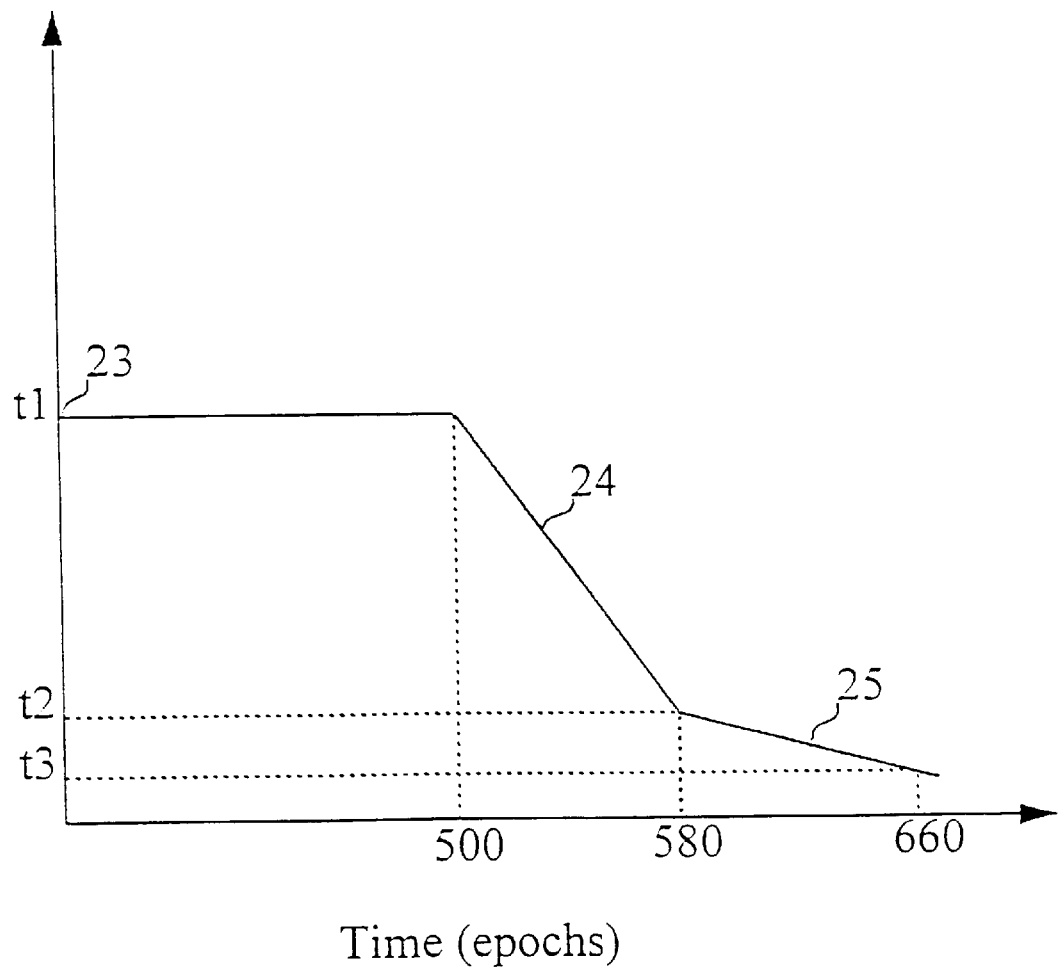
FIG. 5 illustrates a graph of the temperature verses time characteristics of the simulated annealing process of the region generation annealing process of the preferred embodiment.

Referring now to FIG. 5, the annealing process preferably proceeds according to a variation of the normal annealing routine. In this variation the initial temperature is not started at an extremely large value as is the normal routine, but is started at an intermediate temperature t1 23. This temperature is held constant for about 500 time units, or 'epochs', with one epoch being a unit of measure determined by an acceptance of a new objective function a number of times equal to the number of independent variables in the problem space. For an array of 600×600 dots, there are 360,000 variables and so one epoch is measured to be 360,000 acceptances. After 500 epochs, the temperature is then lowered 24 fairly rapidly over a period of 80 epochs to a temperature t2, before being further cooled 25 at a slower rate for a further 80 epochs to a final temperature t3. The actual values of t1, t2 and t3 are measured in units of the objective function and are best found by means of experimentation. It has been found, in practice that the chosen values should be scaled by the region size (in the present case equal to nine). In the present instance a suitable value for t1 is 900 (100×region size), with t2 being 180 and t3 being 45 respectively.

The holding of the temperature constant 23 at an intermediate temperature t1 for 500 epochs is analogous to "baking" the dither matrix so that each initial straight line region 16 (FIG. 3) undergoes a melting effect whereby its dots are spread out over a small area of the array 15. If the normal annealing scheme is used with a very high initial temperature, then this is thought to have a 'vaporising' affect on the regions, spreading them out all over the matrix. Unfortunately, the use of a very high initial temperature scheme appears to also have a 'hysteresis' affect on the anneal process whereby the regions are found to form much too slowly upon cooling. With high temperature initial conditions, the centre of gravity can become ill defined so that the dots of any particular region will not tend towards any particular location. Hence the baking process as outlined is preferred because it preserves a well defined centre of gravity.

Additionally, it should be noted that the annealing process is preferably not taken to completion but terminated at temperature t3. Although it has not been confirmed, it is thought that the optimal solution of the objective function value is likely to be where all the regions are of a square or hexagonal shape. As this would introduce unwanted regularity into the array, it is considered advantageous to terminate the annealing process early so as to maintain some irregularity.

Figure 6:
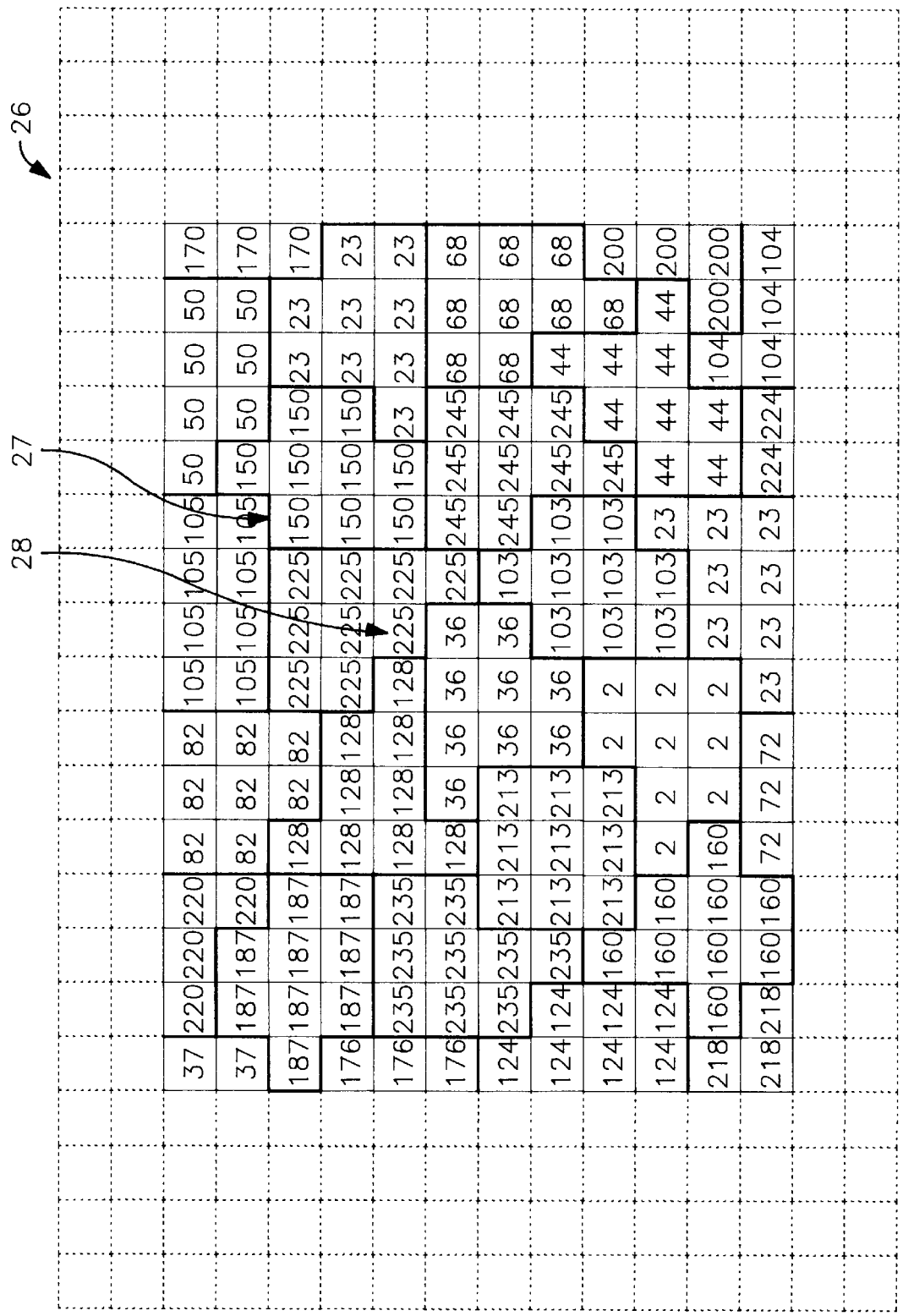
FIG. 6 illustrates, in part, the final form of the dither matrix of FIG. 3.

By way of example, a 600×600 matrix of regions with each region containing nine dots was formed as outlined above and annealed according to the annealing schedule of FIG. 5, with the annealing process taking approximately 80 hours of computer time on a SS2 computer from Sun Microsystems. In FIG. 6, there is shown a portion of the form of the resultant array 26 which consists of regions 28 having irregular boundaries 27 with the placement of regions within the array also being irregular. These irregular boundaries and placement were found to be particularly effective in reducing the occurrence of Moire patterns and Rosettes in subsequent dither operations.

2. Produce a dither matrix from the first large array having dispersed dot characteristics.

By way of example it will be assumed that it is desired to form a dither matrix having 256 separate intensity levels.

The irregular regions 28 are formed within the array 26 which is 600×600 dots in size. Hence, there are 600×600/9=40,000 regions. A centre of gravity for each of the regions is calculated and stored with the information describing each region. Next, 156 sets of the dither numbers 0 to 255 are assigned to the regions in a random order, with each region receiving at most one dither number. As 156×255=39,780 there will be 220 remaining unassigned regions. These remaining regions are assigned numbers evenly distributed between 0 and 255. Next, the dither value assignment is randomised by picking two regions at random and swapping their dither values. This is done a large number of times, with, in the present example, the number of times being chosen to be twenty times the number of regions.

The next step is to optimise the dither matrix comprising the dither numbers. This optimisation comprises a known method of annealing of the dither numbers with the objective function being the sum over all intensity levels, of all pairs of regions r1, r2, both having a same colour (ie. both being either "on" or "off") at that level, of an inverse distance measure of the distance between the centre of gravity of the regions having indices r1, r2. One form of a suitable equation is:

$$obj = \sum_{\substack{\text{all possible} \\ \text{levels } I}} w(I) \sum_{\substack{\text{all possible pairs of} \\ \text{regions } r1, r2 \text{ having} \\ \text{the same colour at} \\ \text{a given intensity}}} \frac{1}{dist(r1, r2)^\gamma} \quad (EQ\ 6)$$

where w(I) is a weighting function with respect to intensity with w(I)=1 for all intensities being that used in creation of dither matrices with the preferred embodiment.

The variation operation for this anneal is to choose two regions at random and swap the dither numbers belonging to the two regions. Additionally, it has been found, through experimentation, that a values of γ=1 or γ=1 are suitable.

Although the above objective function produces superior results, the time taken to calculate the objective function and hence the time taken to calculate the anneal can be excessive and several methods can be utilised to provide for a more efficient form of calculation of an objective.

For a n×m sized dither matrix with each region having nine dots the number of dither value entries will be $$\text{\#entries} = n \times m/9 \qquad (EQ\ 7)$$

Equation 6 requires that each evaluation of the objective function will have the following time order:

$$\text{Time Per Evaluation} = O(\text{\#entries}^2 \times \text{\#intensities}) \qquad (EQ\ 8)$$
$$= O(n^2 \times m^2 \times \text{\#intensities})$$

For simulated annealing to work, every dither matrix entry must be swapped many times. If an "epoch" is defined to be approximately equal to a number of swaps corresponding to the number of cells in the array (i.e. an epoch is approximately equal to n×m/9), then the simulated annealing process may typically take several hundred epochs. Therefore the time for completion will be approximately as follows:

$$\text{Time for Completion} = \text{\#epochs} \times \text{\#evaluations per epoch} \times \text{\#time per evaluation} \qquad (EQ\ 9)$$
$$= O(\text{\#epochs} \times n^3 \times m^3 \times \text{\#intensities})$$

For a 600×600 matrix for a 256 intensity level input image, annealed for 500 epochs, the time order for completion will be:

$$\text{Time for Completion} \approx 500 \times 600^3 \times 600^3 \times 256/9^3 \text{ interations} \approx 8.2 \times 10^{18} \text{ interations} \qquad (EQ\ 10)$$

Such a number is far too excessive for completion of the above task for the defined array size. Therefore, the use of further optimizations is necessary for all but small matrix sizes.

Now, given that D(r) is the dither matrix value of a region r, then the number of intensity levels for which two dither matrix regions r1 and r2 will have the same colour (as previously defined) will be:

$$\text{\#intensities of regions } r1,\ r2 \text{ having the same colour} = (\text{\#intensities} - |D(r1) - D(r2)|) \qquad (EQ\ 11)$$

Therefore Equation 6 can be rearranged as follows:

$$obj = \sum_{\substack{[\text{all possible pairs of} \\ \text{regions } (r1,r2) \text{ with} \\ r1 \text{ not equal to } r2]}} \frac{1}{dist(r1, r2)} \cdot (\text{\#intensities} - |D(r1) - D(r2)|) \qquad (EQ\ 12)$$

This removes the summation over all intensity levels of Equation 5 resulting in a substantial overall speedup.

The number of intensity levels (#intensities) will be a constant and adding a constant to the objective function will not change the solution resulting from the optimisation. Therefore, this term can be removed from the objective function yielding:

$$obj = -\sum_{\substack{[\text{all possible pairs of} \\ \text{regions } (r1,r2) \\ r1 \text{ not equal to } r2]}} \frac{|D(r1) - D(r2)|}{dist(r1, r2)} \qquad (EQ\ 13)$$

Further speedups can be obtained by noting that the simulated annealing process only requires the computation of the change in the objective function due to the swapping of two dither matrix entries and computation of the objective is not actually required. Most of the dither values in Equation 13 are unaltered when the dither matrix entries of two regions are swapped and only pairs involving one of the two chosen regions involved in the swap change their values.

The contribution, denoted ob_dr, to Equation 13 of a dither matrix entry Dc orresponding to the centre of gravity of the region rc is given by:

$$ob\_dr(Dc, rc) = -\sum_{\text{all regions } r, r \text{ not equal to } rc} \frac{|Dc - Dr|}{dist(rc, r)} \qquad (EQ\ 14)$$

where Dr is the dither value at a point r.

Therefore, the change in the objective function given in Equation 13 due to swapping the dither matrix values located at the regions r1 and r2 is given by:

$$\Delta objective = ob\_dr(D2, r1) + ob\_dr(D1, r2) - ob\_dr(D1, r1) - ob\_dr(D2, r2) \qquad (EQ\ 15)$$

where dither matrix value D1 starts at region r1 and moves to region r2, and dither matrix value D2 starts at region r2 and moves to region r1.

The evaluation of Equation 15 requires the examination of every point of the dither matrix four times, rather than examination of every pair of points of the dither matrix as required by Equation 13. This again results in a substantial speedup and Equation 14 and Equation 15 are preferably used in the creation of small and medium sized dither matrices.

The time order for completion will then be:

$$\text{Time for Completion} = \text{\#epochs} \times \text{\#evaluations per epoch} \times \text{\#time per evaluation} = O(\text{\#epochs} \times n^2 \times m^2) \qquad (EQ\ 16)$$

This compares favourably with Equation 9 and is practical for small to medium sized dither matrices (less than say 5,000 regions).

For dither matrices having a larger number of regions, further speedup is required to make the annealing practical. This can be achieved by using a simple approximation.

The computation involved in Equation 14 involves an inverse distance relationship. This involves a large number of regions that contribute very little to the final result because their centre of gravity is a large distance away from the centre of gravity rc which is the region of interest. The approximation involves neglecting the contribution of these regions, and only using regions which are within a small distance of rc. This imposes a circular window about rc with a radius designated to be "window_radius".

Equation 14 can thus be approximated as follows:

$$ob\_dr(Dc, rc) = - \sum_{\substack{\text{all regions } r, r \text{ not equal to } rc \\ \text{and } dist(r,rc) \leq window\_radius}} \frac{|Dc - Dr|}{dist(rc, r)} \quad (EQ\ 17)$$

Use of Equation 17 was found, in practice, to give inferior resulting dither matrices because of the discontinuity introduced when the dist( ) equals window_radius. This is continuity is remedied by using instead the following formula:

$$ob\_dr(Dc, rc) = - \sum_{\substack{\text{all regions } r, r \text{ not equal to } rc \\ \text{and } dist(r,rc) \leq window\_radius}} |Dc - Dr| \cdot \left( \frac{1}{dist(rc, r)} - \frac{1}{window\_radius} \right) \quad (EQ\ 18)$$

which removes this discontinuity and is used in the preferred embodiment when a larger dither matrix is required. With a 600×600 array, a window radius of 40 to 60 dots was found to be suitable.

The time to compute initial dither matrixes using Equation 18 is then of the following order:

Time for Completion=O(#epochs×$n$×$m$×window_radius$^2$) (EQ 19)

This has been found to be practical even for the creation of very large dither matrices. Tus the use of the above described method which is known for dither matrices which do not consist of regions, has been found to be useful in relation to the present invention.

Turning now to FIG. 6 there is shown a portion of the final dither matrix 26 which is of size 600×600 dots. The dither matrix 15 is divided into its final regions 27. Each region comprises nine dots 28 with each dot of a region being assigned the dither value for that region. The final dither matrix being used in place of the normal dither matrix used in conjunction with the printing process.

3. Additional Post Processing Steps used to Reduce the Effects of Dot Gain.

(i) Nyerking

Figure 7:
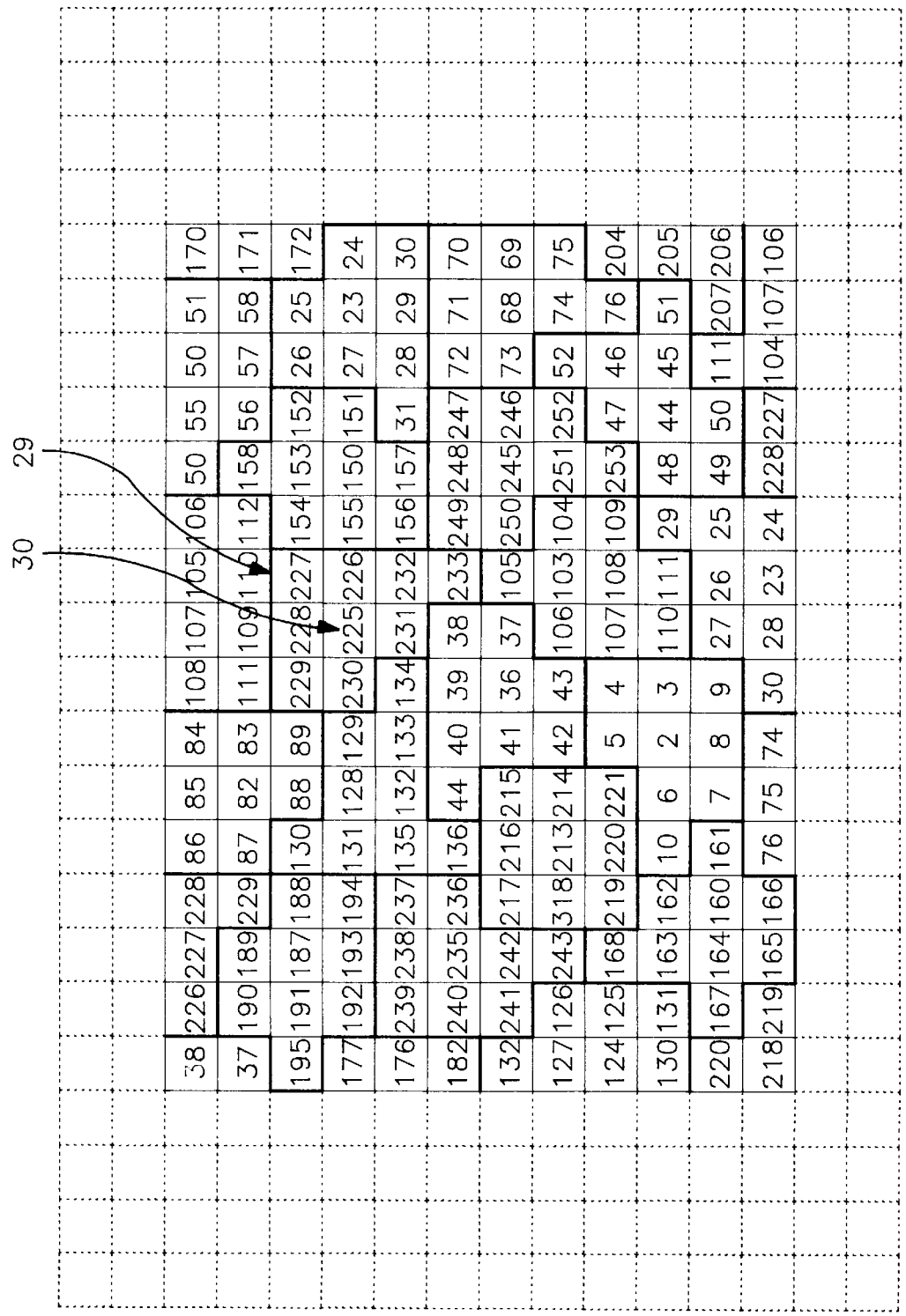
FIG. 7 illustrates, in part, a modified final form of the dither matrix of FIG. 3.

Referring now to FIG. 7 there is shown a further enhancement of the preferred embodiment whereby each region 29 of the dither matrix formed in accordance with step 2 above is itself subjected to a clustered dot dithering technique. In this variation, a central value of the region 30 is chosen to take on the regions computed dither value from the previous step and the rest of the region is treated as if it formed a clustered dot dither matrix, with the values assigned to surrounding dots in a radially increasing manner. Alternatively, a centre of gravity of a region can be calculated and each value within a region turned on in an order that is determined by the distance of the value from the centre of gravity. The term "Nyerking" has been coined to refer to this refinement.. The use of this enhancement results in each region gradually turning on rather than all elements of a region being turned on at the same time as would occur with the matrix of FIG. 6. This can produce a higher fidelity result.

Figure 8:
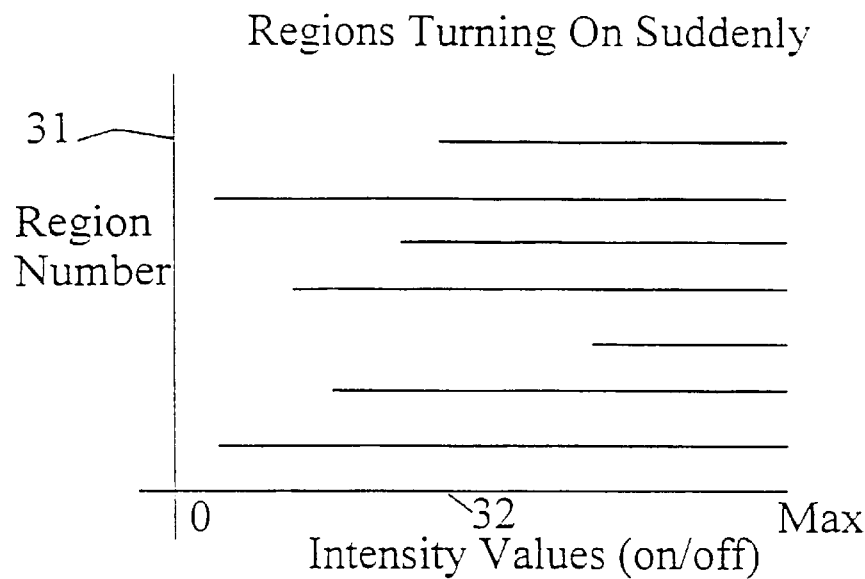
FIG. 8 is a graph illustrating an abrupt turning on of region values.
Figure 9:
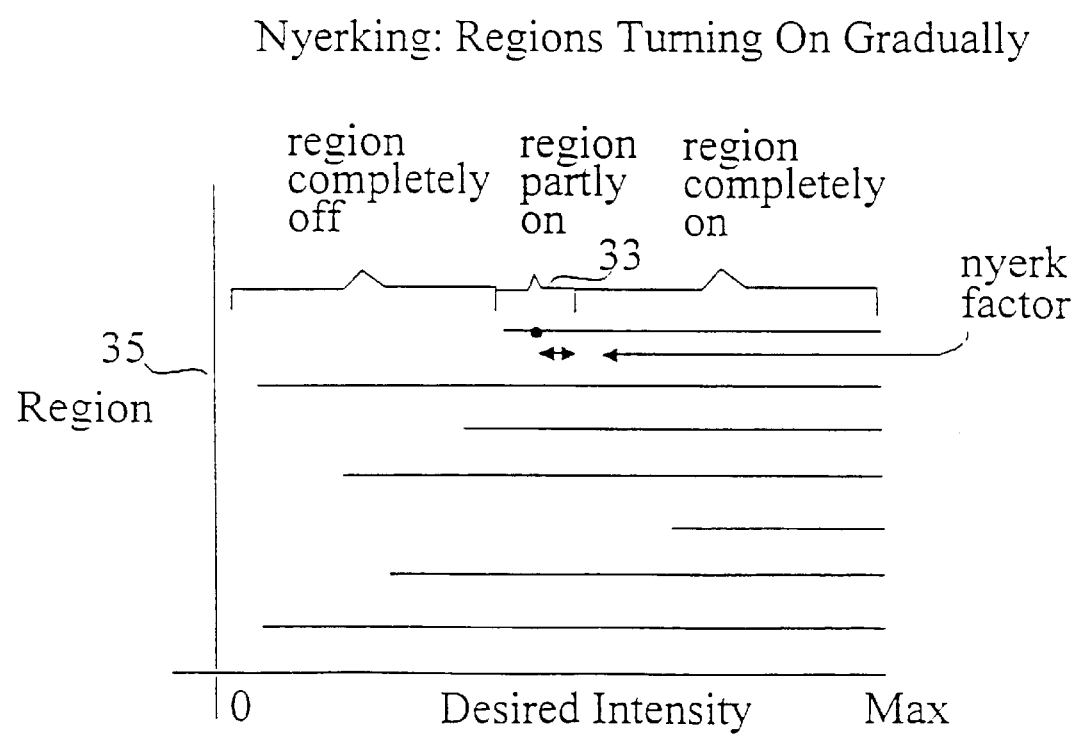
FIG. 9 is a graph illustrating a "Nyerking" process.

More sophisticated methods of "Nyerking" are possible. For example, as seen in FIG. 8, there is shown a graph of Region Number verses Intensity Value for an arbitrary portion of the dither matrix at the end of stage 2 above. For a given region number 31, the whole of the region will turn on at an input intensity value 32 and will remain on for all higher intensity values. FIG. 9 shows the influence of Nyerking on particular regions. Instead of completely turning on a region 35 at one particular value, the region is gradually turned on 33. The 'gradualness' of the turning on of a region can be controlled by a 'Nyerking factor'. The nyerking factor is defined to be half the number of intensity values over which a region is turned on. For example, if a region is designed to take 10 intensity levels to turn on, the nyerk factor is 10/2=5. Setting the nyerking factor to be zero results in regions being turned on abruptly as in the dither matrix as it exists after stage 2, with larger nyerking factors resulting in a more gradual turning on of regions.

(ii) Nyerk Reversal

As mentioned previously, to minimise the dot gain and maximise the print stability, it is important that on-dots of the region form as compact a "ball" or cluster as possible. Hence, it is preferred that the centre of gravity technique is used as this results in the inner-most dot turning on first, then the dots further out being turned on. This results in the effect of regions forming a compact "ball", which increased in size with increasing intensity.

Figure 10:
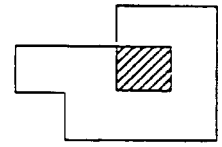
FIG. 10 illustrates the region growing method used with the preferred embodiment.
Figure 10:
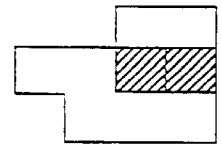
Figure 10:
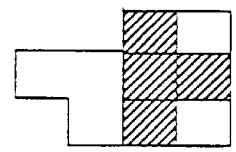
Figure 10:
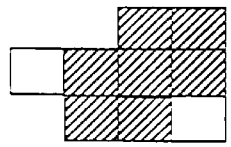

FIG. 10 shows an example of this process. The values comprising an arbitrary region 34 are assigned increasing dither values, dependent on the their distance from a centre of gravity. The illumination of portions of the region are then shown for regions of intensity levels 3,4,6 and 9 respectively.

The nyerking process described above works very well in areas of an output image that cause only a few regions to be illuminated after the process of halftoning. Once the number of regions illuminated becomes substantial, an excessive number of fine, thin outer 'rings' will appear where portions of a region have not been turned on. These fine thin rings can cause significant problems in dot gain variations. In order to overcome these problems, a process of 'Nyerking Reversal' is applied for those regions that lie above a 50% overall intensity value. In this refinement, at the point of 50% intensity, the role of turning on and off regions is reversed, with a region growing from its outermost value, furthest from the centre of gravity, inwards to the value closest to the centre of gravity. This has the effect of subsequently creating an inner region that will shrink with increasing intensity values and substantially eliminates the dot-gain problems caused by thin rings.

Figure 11:
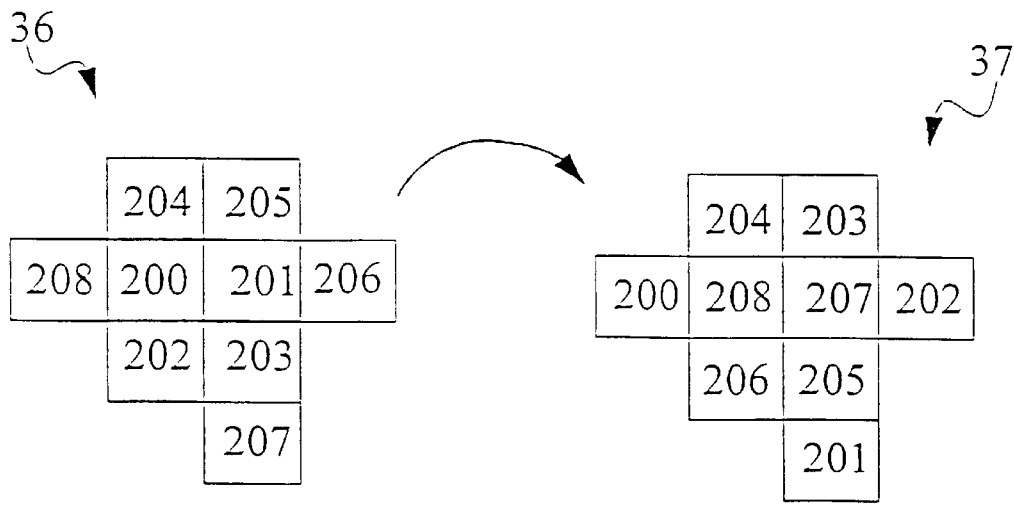
FIG. 11 illustrates the "Nyerking Reversal" of a region of a dither matrix.
Figure 12:
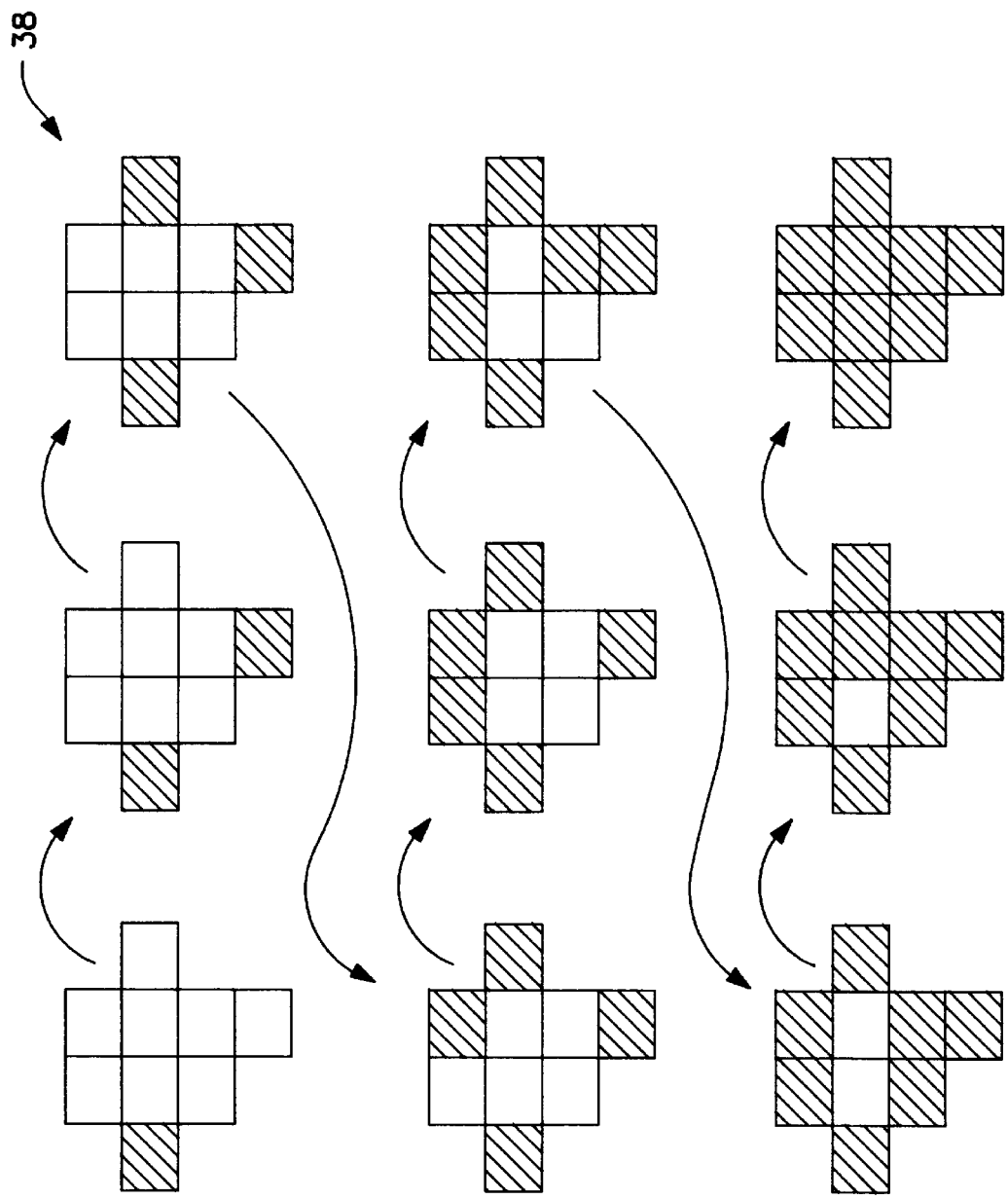
FIG. 12 illustrates the growth of ink dots with regions of increasing dither levels when utilizing the Nyerking reversal process.

An example of this process will now be explained with reference to FIGS. 11 and 12. In FIG. 11 there is shown a first region 36 having dither values 200–208 growing from a "centre of gravity" of the region. A second region 37 is shown having dither values 200–208 which grow in an opposite manner, from the exterior of the region, in towards the regions centre of gravity. In FIG. 12 there is shown the sequence of output patterns 38 produced for a region corresponding to region 37 of FIG. 11 with each level of increasing intensity. It can be seen from the patterns 38 that the central unshaded portion is gradually reduced in size and the production of an outer ring, which would normally be the case, is eliminated.

(iii) Boundary Nverking

For region dither values which are less than one nyerk-factor different from the maximum or minimum possible dither values, an intensity transform is necessary to prevent dither values being outside the allowed intensity ranges. The following C code fragment of the transform has be found to work well in practice:

```
if(dither_val < NYERK_FACTOR + NYERK_FACTOR/region_size)
{
    dither_val = dither_val * ((NYERK_FACTOR/region_size)
        /(NYERK_FACTOR+NYERK_FACTOR/region_size))
        + NYERK_FACTOR;
}
```

-continued

```
else if (dither_val > MAX_DITHER_VALUE -(NYERK_FACTOR +
        NYERK_FACTOR/region_size))
{
        dither_val = MAX_DITHER_VALUE -dither_val;
        dither_val = dither_val* ((NYERK_FACTOR/region_size)/
            (NYERK_FACTOR+NYERK_FACTOR/region_size)) +
            NYERK_FACTOR;
    dither_val = MAX_DITHER_VALUE -dither_val;
}
```

(iv) Correcting Intensity Distortions

Figure 13:
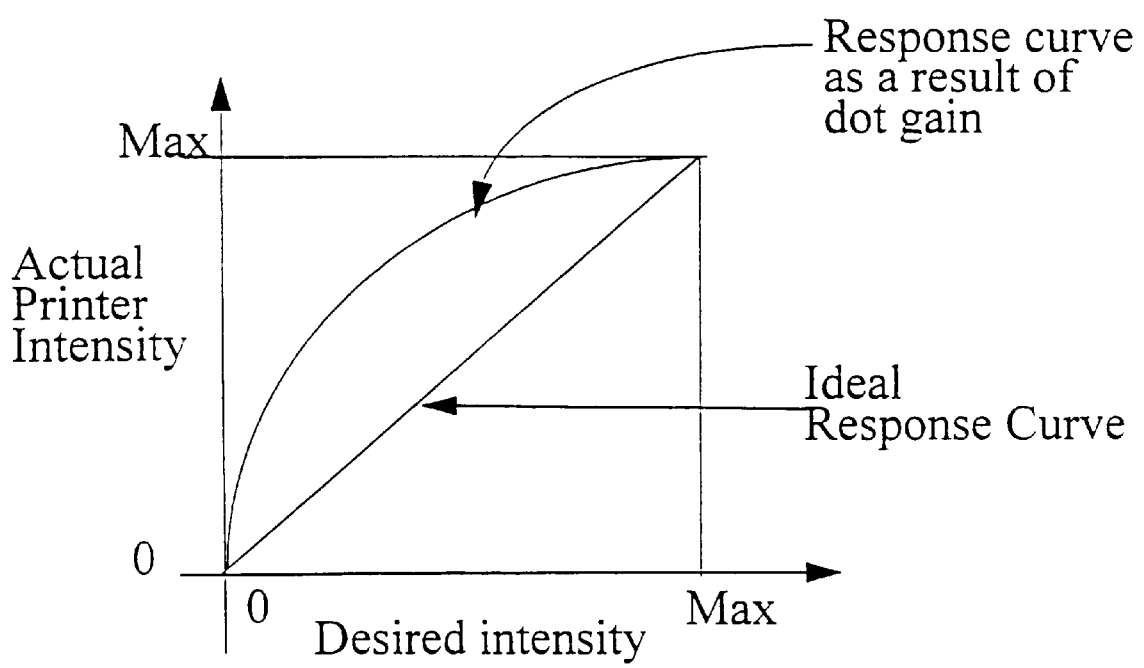
FIG. 13 is a graph illustrating the effects of dot gain.

Further processing can be applied to correct intensity distortions due to dot gain problems. These include:

1) Applying a colour-correction function to the input intensity values of the required image before halftoning. Referring now to FIG. 13, there is shown the ideal response curve for a printing process as opposed to the response curve as a result of dot gain. The colour-correction function should be the inverse function of the dot-gain distortion curve to correct for its affects.

The disadvantage of this method is that integer round-off errors can occur in applying the colour-correction function which can reduce the effective number of colours which can be displayed by the system. The advantage is that the method is simple to implement and easy for a user to control.

2) Applying the required colour-correction function to the dither matrix directly. To avoid integer round-off, the original dither matrix can be generated with floating-point values for regions, or with integer values covering a much larger range than is required (normally being 0 to 255 for an 8 bit colour system). The nyerking and colour correction functions can then be applied to the dither matrix before it is mapped to the required range with rounding to the nearest possible integer value.

The foregoing describes the preferred embodiment of the present invention with minor variations also disclosed. Modifications, obvious to those skilled in the art, can be further made thereto without departing from the scope of the invention.

We claim:

1. A method of producing a dither matrix, said method comprising the steps of:
   creating an array of dots and dividing said array into a multiplicity of regions, each of said regions having a multiplicity of dots;
   altering the borders of said regions to have substantially continuous randomly irregular boundaries; and
   assigning dither values to each of said regions.

2. A method of producing a dither matrix as claimed in claim 1, wherein said altering step includes altering the position of said regions within said array so that the position of the centre of gravity of each of said regions is substantially randomly irregularly placed within said array.

3. A method of producing a dither matrix as claimed in claim 1, wherein said assigning step includes the step of optimizing the assignment of dither values so as to substantially randomly disperse regions which are illuminated at the same level.

4. A method of producing a dither matrix as claimed in claim 1 or 2, wherein said altering step comprises altering said regions through a process of simulated annealing.

5. A method of producing a dither matrix as claimed in claim 4, wherein said process of simulated annealing includes using an objective function derived from a centre of gravity of each said region.

6. A method of producing a dither matrix as claimed in claim 1, wherein each of said regions have substantially the same number of dots.

7. A method of producing a dither matrix as claimed in claim 1, wherein the size of said regions is dependent on the dot gain of the device that the dither matrix is to be used with.

8. A method of producing a dither matrix as claimed in claim 1, wherein said assignment step includes the assignment of the same dither value to each dot in a region.

9. A method of producing a dither matrix as claimed in claim 1, wherein said assignment step includes treating each region as a clustered dot ordered dither matrix with substantially randomly irregular boundaries and assigning said dither value to at least one dot within the region.

10. A method of producing a dither matrix as claimed in claim 1, further comprising the step of:
    calculating the centre of gravity of a region and assigning increasing dither values to the dots within a region in order of increasing distance of the dot from the centre of gravity of the region.

11. A method of producing a dither matrix as claimed in claim 1, further comprising the steps of:
    dividing the regions into at least two groups, with a first group containing low dither values and a second group containing high dither values;
    for those regions in the first lower dither value group, assigning increasing dither values, having values near said lower dither value, to the dots within each region, said assignment being in order of increasing distance of a current dot from a central portion of said region; and
    for those regions in the second higher dither value group, assigning increasing dither values, having values near said higher dither value, to the dots within each region, said assignment being in order of decreasing distance of the dot from a central portion of said region.

12. A method of producing a dither matrix as claimed in claim 11, wherein said central portion of said region comprises the centre of gravity of said region.

13. A method of producing a dither matrix as claimed in claim 11, wherein the number of said groups is two.

14. A method of producing a dither matrix as claimed in claim 13, wherein said division occurs substantially around the 50% intensity level of the values of said dither matrix.

15. A method of producing a dither matrix, said method comprising the steps of:
    creating an array of dots and dividing said array into a multiplicity of regions, each of said regions having a multiplicity of dots;
    assigning a first dither value to each of said regions;
    dividing the regions into at least two groups, with a first group containing lower dither values and a second group containing higher dither values;
    for those regions in the first lower dither value group, assigning increasing dither values, around said first dither value, to the dots within each region in order of increasing distance of a current dot from a central portion of said region; and
    for those regions in the second higher dither value group, assigning increasing dither values, around said first dither value, to the dots within each region in order of decreasing distance of the dot from from a central portion of said region.

16. A method of producing a dither matrix as claimed in claim 15, wherein said central portion of said region comprises the centre of gravity of said region.

17. A method of producing a dither matrix as claimed in claim 15, wherein the number of said groups is two.

18. A method of producing a dither matrix as claimed in claim 17, wherein said division occurs substantially around the 50% intensity level of the values of said dither matrix.

19. A method of producing a dither matrix as claimed in any of claims 9 to 18, further comprising altering dither values which are outside the range of usable dither values so that they are inside the range of usable dither values.

20. A method of producing a dither matrix as claimed in claim 19, wherein said alteration comprises resealing all the dither values within a region so that they are all inside the range of usable dither values.

21. A method of producing a dither matrix, said method comprising the steps of:

creating an array of dots and dividing said array into a multiplicity of regions, each of said regions having a multiplicity of dots;

altering the borders of said regions to have substantially continuous irregular boundaries; and assigning dither values to each of said regions, wherein said assigning step includes the step of optimizing the assignment of dither values so as to disperse regions which are illuminated at the same level, and wherein said optimizing step includes reducing an objective function based on the inverse distances between dots or regions illuminated on the same level.

22. A method of producing a dither matrix as claimed in claim 21, wherein said optimizing step includes annealing said objective function.

23. A method of producing a dither matrix as claimed in claim 21, wherein said objective function is substantially of the form:

$$obj = \sum_{\substack{all\ possible \\ levels\ l}} w(l) \sum_{\substack{all\ possible\ pairs\ of \\ regions\ r1,\ r2\ having \\ the\ same\ colour\ at \\ a\ given\ intensity}} \frac{1}{dist(r1, r2)^\gamma}$$

where w(I) is a predetermined weighing function, I is a given intensity level, r1 and r2 are regions, dist(r1,r2) is an absolute distance measure between regions r1 and r2 and is a distance weighing factor.

24. A method of producing a dither matrix as claimed in claim 21, wherein said objective function is reduced utilizing a measure of a difference in an objective function of the form $$ob\_dr(Dc, rc) = - \sum_{\substack{all\ regions\ r, r\ not\ equal\ to\ rc \\ and\ dist(r,rc) \leq window\_radius}} \frac{|Dc - Dr|}{dist(rc, r)}$$

where ob_dr( ) is a difference in the objective function, Dc is a dither matrix value at a point rc, Dr is the dither matrix value at the point r and window_radius is a predetermined constant indicating a window radius of influence.

25. A method of producing a dither matrix, said method comprising the steps of:

creating an array of dots and dividing said array into a multiplicity of regions, each of said regions having a multiplicity of dots;

altering the borders of said regions to have substantially continuous irregular boundaries; and assigning dither values to each of said regions, wherein said altering step comprises altering said regions through a process of simulated annealing, wherein said process of simulated annealing includes using an objective function derived from a centre of gravity of each said region and wherein said objective function is substantially of the form:

$$obj = \sum_{(all\ regions)} \sum_{\substack{pairs\ d1,\ d2 \\ within\ a\ region}} dist(d1, d2)^2$$

wherein d1 and d2 are dots within a region and dist (d1,d2) is an absolute distance measure of the distance between the dots d1 and d2.

26. A method of producing a dither matrix, said method comprising the steps of:

creating an array of dots and dividing said array into a multiplicity of regions, each of said regions having a multiplicity of dots;

altering the borders of said regions to have substantially continuous irregular boundaries;

assigning dither values to each of said regions; and altering the dither values assigned to data in accordance with a predetermined colour correction function.

27. A method of producing a dither matrix, said method comprising the steps of:

creating an array of dots and dividing said array into a multiplicity of regions, each of said regions having a multiplicity of dots;

altering the borders of said regions to have substantially continuous irregular boundaries; and assigning dither values to each of said regions, wherein said altering step comprises altering said regions through a process of simulated annealing, and further comprising the step of altering the dither values assigned to data in accordance with a predetermined colour correction function.

28. A method of producing a dither matrix as claimed in claim 27, wherein said process of simulated annealing includes using an objective function derived from a center of gravity of each region.

29. A method of producing a dither matrix as claimed in claim 28, wherein said objective function is substantially of the form:

$$Obj = \sum_{(all\ regions)} \sum_{\substack{pairs\ d1,\ d2 \\ within\ a\ region}} dist(d1, d2)^2$$

wherein d1 and d2 are dots within a region and dist(d1,d2) is an absolute distance measure of the distance between the dots d1 and d2.

30. A method of producing a dither matrix, said method comprising the steps of:

creating an array of dots and dividing said array into a multiplicity of regions, each of said regions having a multiplicity of dots;

altering the borders of said regions to have substantially continuous irregular boundaries;

assigning dither values to each of said regions;

altering dither values which are outside the range of usable dither values so that they are inside the range of usable dither values; and altering the dither values assigned to dots in accordance with a predetermined colour correction function, wherein said assignment step includes treating each region as a clustered dot ordered dither matrix with irregular boundaries and assigning said dither value to at least one dot within the region.

31. A method of producing a dither matrix, said method comprising the steps of:

creating an array of dots and dividing said array into a multiplicity of regions, each of said regions having a multiplicity of dots;

altering the borders of said regions to have substantially continuous irregular boundaries;

assigning dither values to each of said regions;

altering dither values which are outside the range of usable dither values so that they are inside the range of usable dither values; and applying a colour correction function to images used with the dither matrix, wherein said assignment step includes treating each region as a clustered dot ordered dither matrix with irregular boundaries and assigning said dither value to at least one dot within the region.

32. A method of producing a dither matrix, said method comprising the steps of:

creating an array of dots and dividing said array into a multiplicity of regions, each of said regions having a multiplicity of dots;

altering the borders of said regions to have substantially continuous irregular boundaries;

assigning dither values to each of said regions; and applying a colour correcting function to images used with the dither matrix.

33. A method of producing a dither matrix, said method comprising the steps of:

creating an array of dots and dividing said array into a multiplicity of regions, each of said regions having a multiplicity of dots;

altering the borders of said regions to have substantially continuous irregular boundaries; and assigning dither values to each of said regions, wherein said altering step comprises altering said regions through a process of simulated annealing, and further comprising the step of applying a colour correction function to images used with the dither matrix.

34. A method of producing a dither matrix as claimed in claim 33, wherein said objective function is substantially of the form:

$$Obj = \sum_{(all\ regions)} \sum_{\substack{pairs\ d1,d2 \\ within\ a\ region}} dist(d1, d2)^2$$

wherein d1 and d2 are dots within a region and dist(d1,d2) is an absolute distance measure of the distance between the dots d1 and d2.

35. A method of producing an array comprised of regions, said regions having substantially randomly irregular boundaries and irregular placement within the array, said method comprising the steps of:

determining an initial layout of regions within the array; and optimizing the layout of each region with respect to a centre of gravity measure of each region.

36. A method of producing an array comprised of regions as claimed in claim 35, wherein said optimizing step further comprises a baking step wherein said baking step comprises allowing each region to spread out over a small area relative to the size of the array.

37. A method of producing an array comprised of regions, said regions having irregular boundaries and irregular placement within the array, said method comprising the steps of:

determining an initial layout of regions within the array; and optimizing the layout of each region with respect to a centre of gravity measure of each region, wherein each of said regions further comprises a collection of dots and wherein said optimizing step comprises optimizing an objective function substantially of the form:

$$\sum_{(all\ regions)} \sum_{\substack{pairs\ d1,d2 \\ within\ a\ region}} dist(d1, d2)^2$$

where d1 and d2 are dots within a region and dist (d1,d2) is a measure of the distance between the dots d1 and d2.

38. A method of producing an array comprised of regions as claimed in claim 37, wherein said objective function is subjected to optimization a change in the position of said dots belonging to each region within an array, said change in objective being measured substantially of the form $$\sum_{\substack{all\ dots\ d\ belonging \\ to\ region\ r1\ and\ d \neq d_1}} dist(d, d_2)^2 + \sum_{\substack{all\ dots\ d\ belonging \\ to\ region\ r2\ and\ d \neq d_2}} dist(d, d_1)^2 -$$

$$\sum_{\substack{all\ dots\ d\ belonging \\ to\ region\ r1\ and\ d \neq d_1}} dist(d, d_1)^2 - \sum_{\substack{all\ dots\ d\ belonging \\ to\ region\ r2\ and\ d \neq d_2}} dist(d, d_2)^2.$$

* * * * *

UNITED STATES PATENT AND TRADEMARK OFFICE
CERTIFICATE OF CORRECTION

PATENT NO. : 5,987,219

DATED : November 16, 1999

INVENTOR(S) : WILLIAM CLARK NAYLOR, JR., ET AL.

It is certified that error appears in the above-identified patent and that said Letters Patent is hereby corrected as shown below:

COLUMN 3:

Line 41, "from from" should read --from--; and
    Line 52, "verses" should read --versus--.

COLUMN 4:

Line 37, "affects" should read --effects--.

COLUMN 5:

Line 9, "where as" should read --whereas--.

COLUMN 6:

Line 41, "are" should read --¶are--.

COLUMN 7:

Line 7, "affect" should read --effect--; and
    Line 37, "equation 5," should read --Equation 5,--.

COLUMN 8:

Line 1, "affect" should read --effect--; and
    Line 4, "affect" should read --effect--.

COLUMN 9:

Line 2, "values" should read --value--; and
    "or $\gamma=1$ are" should read --is--.

UNITED STATES PATENT AND TRADEMARK OFFICE
CERTIFICATE OF CORRECTION

PATENT NO. : 5,987,219

DATED : November 16, 1999

INVENTOR(S) : WILLIAM CLARK NAYLOR, JR., ET AL.

It is certified that error appears in the above-identified patent and that said Letters Patent is hereby corrected as shown below:

COLUMN 11:

Line 9, "is" should be deleted;
    Line 10, "continuity" should read --discontinuity--;
    Line 30, "Tus" should read --Thus--;
    Line 48, "regions" should read --region's--; and
    Line 62, "verses" should read --versus--.

COLUMN 12:

Line 6, "nyerk" should read --nyerking--;
    Line 17, "increased" should read --increases--;
    Line 21, "the their" should read --their--;
    Line 53, "Nverking" should read --Nyerking--; and
    Line 58, "be" should read --been--.

COLUMN 13:

Line 19, "affects" should read --effects--.

COLUMN 14:

Line 54, "from from" should read --from--.

UNITED STATES PATENT AND TRADEMARK OFFICE
CERTIFICATE OF CORRECTION

PATENT NO. : 5,987,219
DATED : November 16, 1999
INVENTOR(S) : WILLIAM CLARK NAYLOR, JR., ET AL.

It is certified that error appears in the above-identified patent and that said Letters Patent is hereby corrected as shown below:

<u>COLUMN 18</u>:

Line 37, "optimization" should read --optimizing--.

Signed and Sealed this

Twenty-seventh Day of March, 2001

Attest:

NICHOLAS P. GODICI

*Attesting Officer*     *Acting Director of the United States Patent and Trademark Office*